United States Patent [19]

Domyan et al.

[11] Patent Number: 4,782,660
[45] Date of Patent: Nov. 8, 1988

[54] SEQUENCED AND PRESSURE CONTROLLED INJECTOR

[75] Inventors: Frank F. Domyan, Mission Viejo; Frank J. Gombos, Calabasas, both of Calif.

[73] Assignee: Rockwell International Corporation, El Segundo, Calif.

[21] Appl. No.: 4,520

[22] Filed: Jan. 20, 1987

[51] Int. Cl.⁴ .......................... F02K 9/00; F02K 9/42; F02K 9/72
[52] U.S. Cl. .................................. 60/258; 137/625.4
[58] Field of Search ................. 60/258, 259, 247, 741, 60/742, 746, 739, 39.79, 39.8; 137/607, 625.4; 239/414, 420, 408, 412, 416.5, 424

[56] References Cited

U.S. PATENT DOCUMENTS

| | | |
|---|---|---|
| 2,810,259 | 10/1957 | Burdett, Jr. ............... 60/258 |
| 3,074,231 | 1/1963 | Klein ........................ 60/258 |
| 3,232,049 | 2/1966 | Rhodes ...................... 60/258 |
| 3,234,731 | 2/1966 | Dermody et al. . |
| 3,402,894 | 9/1968 | Wynosky et al. ......... 239/265.17 |
| 3,464,633 | 9/1969 | Potocnik .................. 60/258 |
| 3,482,397 | 12/1969 | Luperi et al. . |
| 3,515,353 | 6/1970 | Young et al. ............ 60/258 |
| 3,527,056 | 9/1970 | Hoffman ................... 60/258 |
| 3,545,203 | 12/1970 | Rumbold .................. 60/258 |
| 3,726,088 | 4/1973 | Kretschmer et al. . |
| 3,748,852 | 7/1973 | Cole et al. ................ 60/258 |
| 3,871,173 | 3/1975 | McKenna ................. 60/258 |
| 4,269,659 | 5/1981 | Goldberg . |
| 4,378,674 | 4/1983 | Bell .......................... 60/39.823 |

OTHER PUBLICATIONS

Astronautics and Aeronautics, "Tiny Engine Combines Muscle and Fast Response", Jun. 1983, pp. 26–30.

Primary Examiner—Carlton R. Croyle
Assistant Examiner—Donald E. Stout
Attorney, Agent, or Firm—H. Fredrick Hamann; Harry B. Field; Lawrence N. Ginsberg

[57] ABSTRACT

An injector assembly 10 for injecting fuel and oxidizer in a combustion chamber 38 of a fluid-fueled rocket engine. Injector assembly 10 comprises a stationary housing 12, a plate member 14 attached to the housing 12, at least one injector subassembly 18 and actuation means 16. Each injector subassembly 18 includes a plug 44 attached to the housing 12 and a movable elongated throttle means 64 connected to the actuation means 16. When the throttle is at least partially open, fuel flows through inlet 20, orifice 110, inner passageway 66, orifice 112 and finally to the combustion chamber 38. Oxidizer flows through inlet 22, orifice 114, outer passageway 68, orifice 116 and finally to the combustion chamber 38. Controlling the flow of propellants at upstream orifices 110,114 controls the propellant pressure at the downstream orifices 112,116 during thrust level changes and corresponding combustion chamber pressure changes of the engine, thereby maintaining a constant stream momentum and combustion efficiency.

9 Claims, 3 Drawing Sheets

SEQUENCED AND PRESSURE CONTROLLED INJECTOR

BACKGROUND OF THE INVENTION

1. Field of the Invention

The present invention relates to liquid or gaseous propellant fueled rocket engines. More specifically, this invention relates to a throttling injector for varying propellant flow rates and consequently rocket engine thrust levels over wide ranges.

2. Description of the Prior Art

It is desirable in the employment of rocket engines to vary the thrust and therefore acceleration of the vehicle. When a rocket engine is used to repetitively fire very short duration burns, the volume of flow passages between the valves and the injector (dribble volume) is very important. Propellant remaining in these passages during the engine off-times is largely wasted and the refilling of passages causes a startup time variation in the subsequent engine firing.

A rocket engine with a throttling injector produces a controlled thrust by modulating the injector flow area. Two common methods exist for the injector flow area modulation. The first method involves modulating the injector flow area by an actuating piston which is itself actively positioned by a separate control valve. The second method involves an active upstream flow control valve in series with a passively actuated (spring loaded) injector flow control device.

However, the above-described methods of modulation have several drawbacks limiting the engine throttling ratio, the maximum thrust and the combustion efficiency. In commonly used throttling injectors the throttling ratio is typically limited to 10:1 (which is the ratio of maximum thrust to minimum thrust). This limitation s due to the rapid degradation in the combustion efficiency which occurs beyond these throttling ranges. The reduced combustion efficiency in the existing design concepts is due to the significant variation in the propellant stream momentum during throttling.

In progressively wider applications of rocket engines, there has been an attendant need for throttling ratios in the range of 20:1 or greater. Accordingly, the above methods have proved unsatisfactory. The variation in the propellant stream momentum is lessened when the injector flow area is indirectly controlled by employing an upstream throttle valve. However, heretofore an accurate stream momentum control has not been feasible without complex control devices. The maximum thrust and engine size is limited in the above common methods due to the increased spray thickness at full thrust with large engines. Large spray thickness causes combustion efficiency degradation.

In U.S. Pat. No. 3,234,731 issued to D. J. Dermody, a variable thrust device and injector is disclosed. The Dermody invention is generally comprises of the combination of a thrust chamber, wherein a plug portion thereof is axially movable to vary the throat area and wherein a variable propellant injector portion includes a poppet axially movable within a propellant passage communicating with a combustion chamber portion of the thrust chamber. The propellant passage includes a plurality of lands and grooves, the grooves being tapered to eventually blend into the lands surfaces near the outlet of the passage into the combustion chamber, and a poppet carrying spring actuated wiper rings slidable over the lands so as to accomplish propellant metering as the poppet is reciprocated.

In the Dermody device, combustion occurs when the propellants are combined just downstream of the poppet. The combustion products therefore impinge directly on, and are deflected by, the plug. This configuration must therefore be operated with an off-mixture ratio keeping the combustion gases relatively cool. The plug and poppet are actuated by independent sources.

The article entitled, "Tiny Engine Combines Muscle and Fast Response," Astronautics and Aeronautics, pages 26-30, June 1983 discloses an upstream and downstream flow control mechanism in the precombustion state of the propellants. The concept employs a decoupled approach to flow control with a cavitating venturi providing a constant mixture ratio of propellants independent of chamber pressure, injector pressure differentials or total flow. The cavitating venturi requires a high upstream pressure due to fluid friction losses. The concept utilizes a single injector pintle element which limits the possible turndown ratio. The pintle element is passively actuated (spring loaded).

OBJECTS OF THE INVENTION

Accordingly, it is an object of the invention to provide a throttling injector assembly which minimizes the degradation in combustion efficiency during throttling.

It is another object to extend the applicability of the variable flow area injector well above the 6,000 lbf thrust level by preventing the formation of excessively thick propellant streams at full thrust level.

Another object is to extend the throttling capability by providing a more precise flow control at low thrust levels.

Other objects, advantages and novel features of the present invention will become apparent from the following detailed description of the invention when considered in conjunction with the accompanying drawings.

SUMMARY OF THE INVENTION

The present invention provides a pressure-controlled injector assembly. In its broadest aspects, the injector assembly comprises a stationary housing, a plate member with at least one opening for containing an injector subassembly and actuation means. The plate member is rigidly attached to the housing. Each injector subassembly includes a plug which is attached to the housing. An outer surface of the plug and the inner surface of the plate member forming the opening cooperate to define a flow passageway. Each injector subassembly also includes an elongated movable throttle means located within the flow passageway which divides the flow passageway into an inner passageway for a flow of first propellant and an outer passageway for a flow of second propellant. The throttle means provides for simultaneous flow control of each propellant at inner and outer downstream sealing locations adjacent the downstream face of the plate member and at inner and outer upstream sealing locations adjacent the upstream face of the plate member. The actuation means controls the movement of the throttle means. Controlling the flow of propellant at the upstream locations controls the propellant pressure at the downstream sealing locations during thrust level changes and corresponding combustion chamber pressure changes of the engine, thereby maintaining a constant stream momentum and combustion efficiency.

3

In its narrower aspects, the injector assembly includes a plurality of injector subassemblies equally disposed in a circumference about the linear actuator, the circumference being coaxial with the linear actuator. The geometry of the throttle means is different in the various subassemblies so as to provide a predetermined, sequential injection propellants into the combustion chamber.

BRIEF DESCRIPTION OF THE DRAWINGS

The same elements or parts throughout the figures of the drawings are designated by the same reference characters.

DETAILED DESCRIPTION OF THE INVENTION

Figure 1:
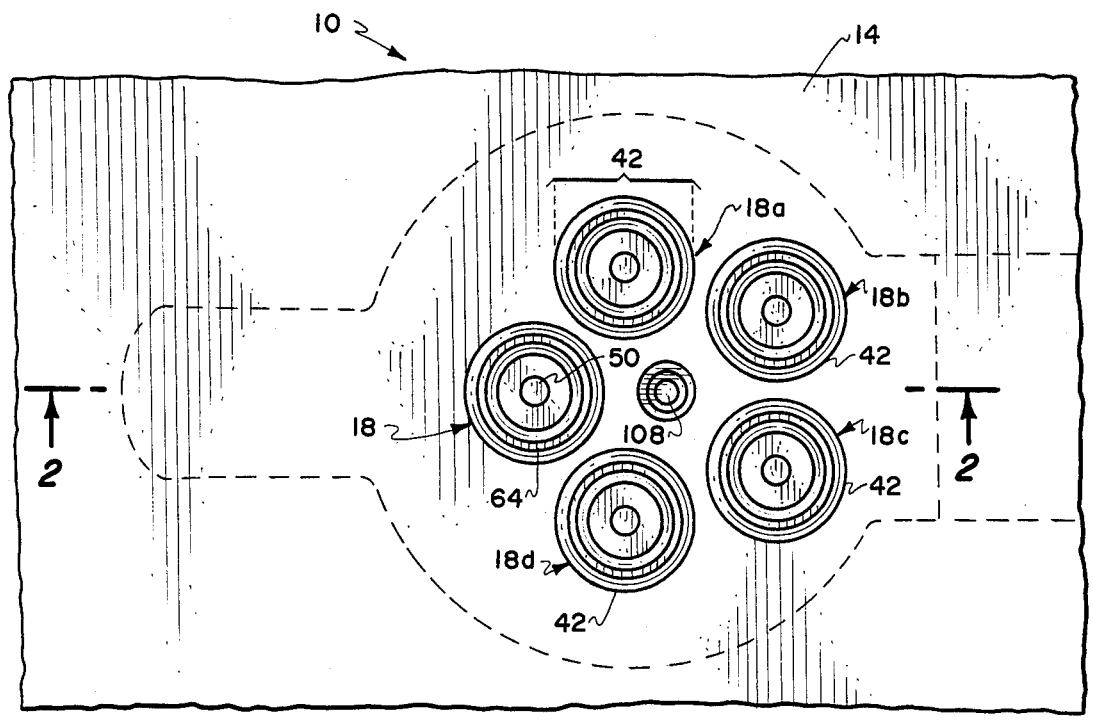
FIG. 1 is a top view of a preferred embodiment of the present invention.
Figure 2:
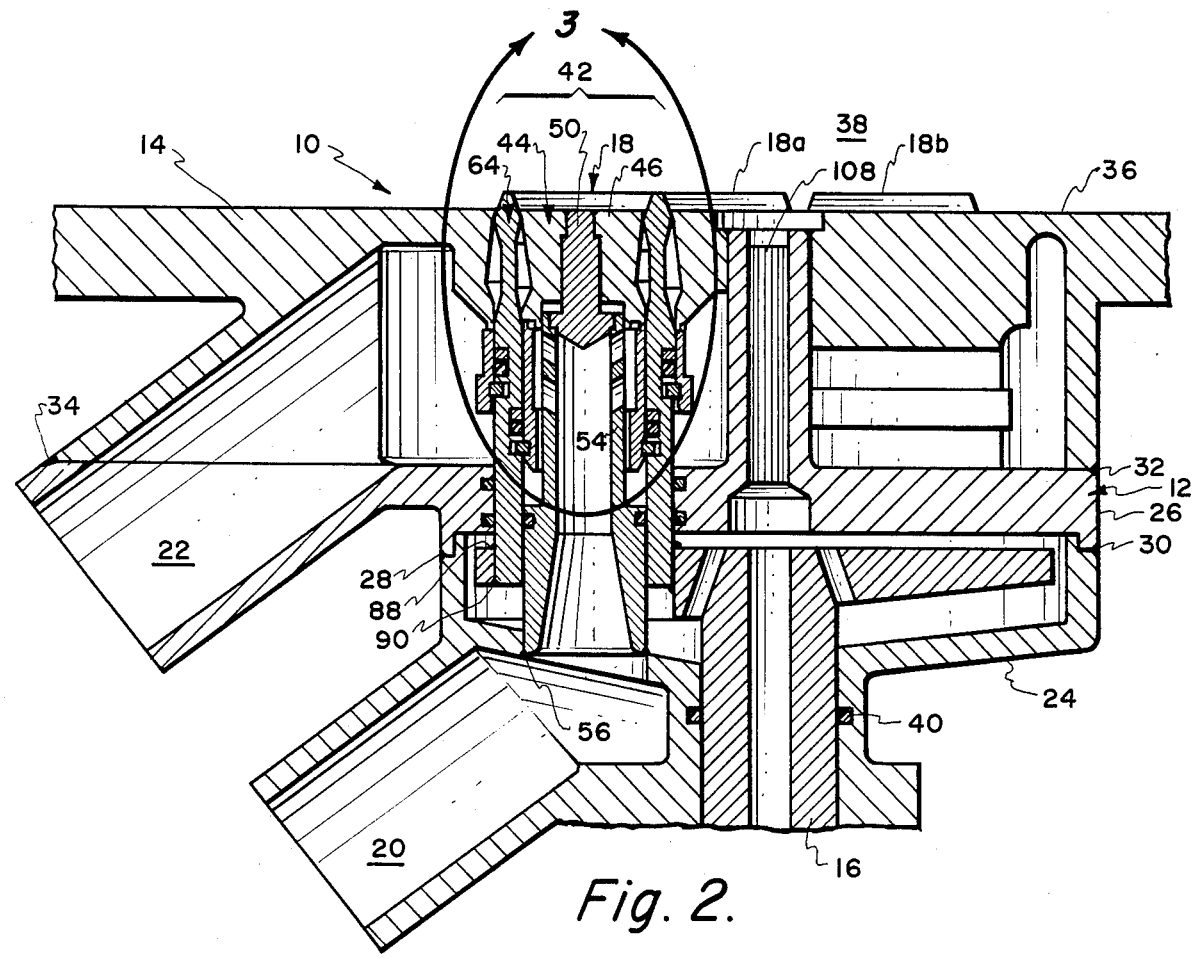
FIG. 2 is a side elevation view of FIG. 1 taken along line 2—2 of FIG. 1.
Figure 3:
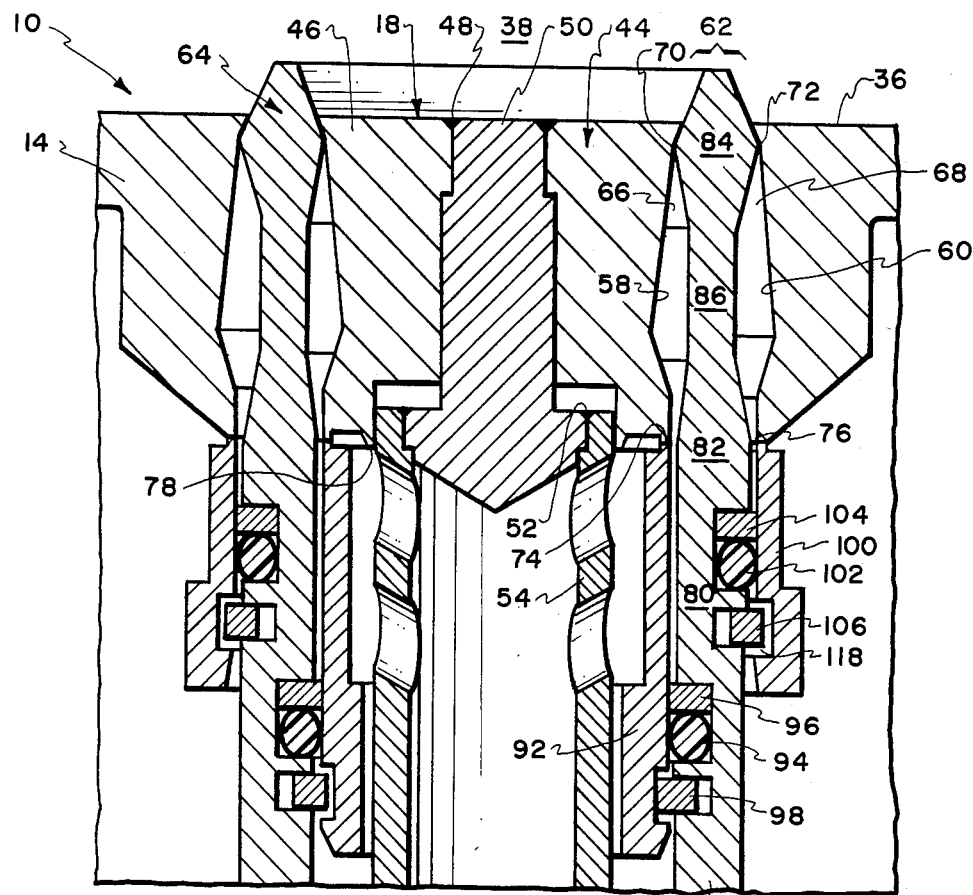
FIG. 3 is an enlarged view taken along line 3—3 of FIG. 2.

Referring to the drawings and to the characters of reference marked thereon, FIGS. 1 and 2 illustrate a preferred embodiment of the injector assembly 10 of the present invention. In FIGS. 1-3 the injector assembly 10 is shown in the closed position. the injector assembly 10 broadly comprises a stationery housing generally designated 12, a plate member 14, actuation means 16 and an injector subassembly which is generally designated 18.

A first and a second propellant, most likely a fuel and an oxidizer are fed through manifold inlets 20 and 22, respectively, and stationary housing 12 under regulated pressure. They are fed under regulated pressure either by gas pressurization or from a pump fed system (not shown). The housing 12 includes body 24 and support plate 26. Support plate 26 is sandwiched between body 24 and plate member 14. FIG. 2 shows support plate 26 welded to body 24 at locations 28 and 30. The plate member 14 is welded to support plate 26 at locations 32, 34.

A downstream face 36 of the plate member 14 is adjacent the combustion chamber 38 of the rocket engine. Preferably, the apparatus 10 will be utilized with a combustion chamber, throat and nozzle which each have a fixed geometry. A fixed geometry is preferred for ease of mechanization. Upstream of the plate member 14 and set within the housing 12 is the actuation means or linear actuator 16, the central axis of which passes through the center of the injector assembly 10. An O-ring 40 seals the linear actuator 16. The plate member 14 as shown in FIG. 1 has five opening 42 which are equidistantly disposed in a circumference about said axis.

Each opening 42 is circular and contains the plug 44 of each injector subassembly 18. Each plug 44 includes an outer plug ring 46 welded (as shown at location 48) to a center stud 50. The center stud 50 is, in turn, welded (as shown at location 52) to fuel passage member 54. The fuel passage member 54 is welded to body 24 at

4 location 56. The entire plug 44 is therefore stationary with respect to housing 12.

The plug 44 is centrally located within its respective opening. An outer surface 58 of the plug 44 and the inner surface 60 of the plate member 14 which forms opening 42 cooperatively define an annular flow passageway 62. An elongated injector throttle means or pintle element 64 of the injector subassembly 18 surrounds the plug 44 and divides the flow passageway 62 into an inner passageway 66 and an outer passageway 68 for flows of fuel and oxidizer, respectively.

Pintle element 64 is capable of axial motion within the flow passageway 62 for simultaneous flow control at inner and outer downstream sealing locations 70 and 72, respectively, adjacent the downstream face 36 of plate member 14 and at inner and outer upstream sealing locations 74 and 76, respectively, adjacent the upstream surface 78 of plate member 14. This simultaneous flow control is dependent upon the position of the pintle element 64.

The pintle element 64 has an upstream end portion 80, an upstream sealing portion 82, a downstream sealing portion 84, and a decreased cross-sectional area portion 86. The upstream sealing portion 82 is operably engaged with the actuation means. Pintle element 64 is welded to actuator 16 at locations 88 and 90 (see FIG. 2). A fuel-side seating ring 92 is mounted along the inner surface of pintle element 64. O-ring 94 and O-ring backup 96 provide adequate sealing. Axial movement of ring 92 relative to pintle element 64 is restrained by square-ring 98. An oxidizer-side seating ring 100 is mounted along the outer surface of pintle element 64. O-ring 102 and O-ring backup 104 provide adequate sealing. Axial movement of seating ring 100 relative to pintle element 64 is restrained by square-ring 106.

Upstream sealing portion 82 of pintle element 64 is located adjacent the upstream end portion 80 and at the upstream sealing location 74 and 76. Upstream sealing portion 80 has a cross-sectional area substantially equal to the area of the flow passageway 62.

Downstream sealing portion 84 is located at the downstream sealing locations 70 and 72 and has a cross-sectional area substantially equal to the area of the flow passageway 62. The decreased cross-sectional area portion 86 is located between the upstream sealing portion 82 and the downstream sealing portion 84. It opposes a decreased diameter region of the plug 44. A heat sink 108 for cooling the chamber pressure balancing gas extends through the injector assembly 10 in order to balance the chamber pressure.

Figure 4:
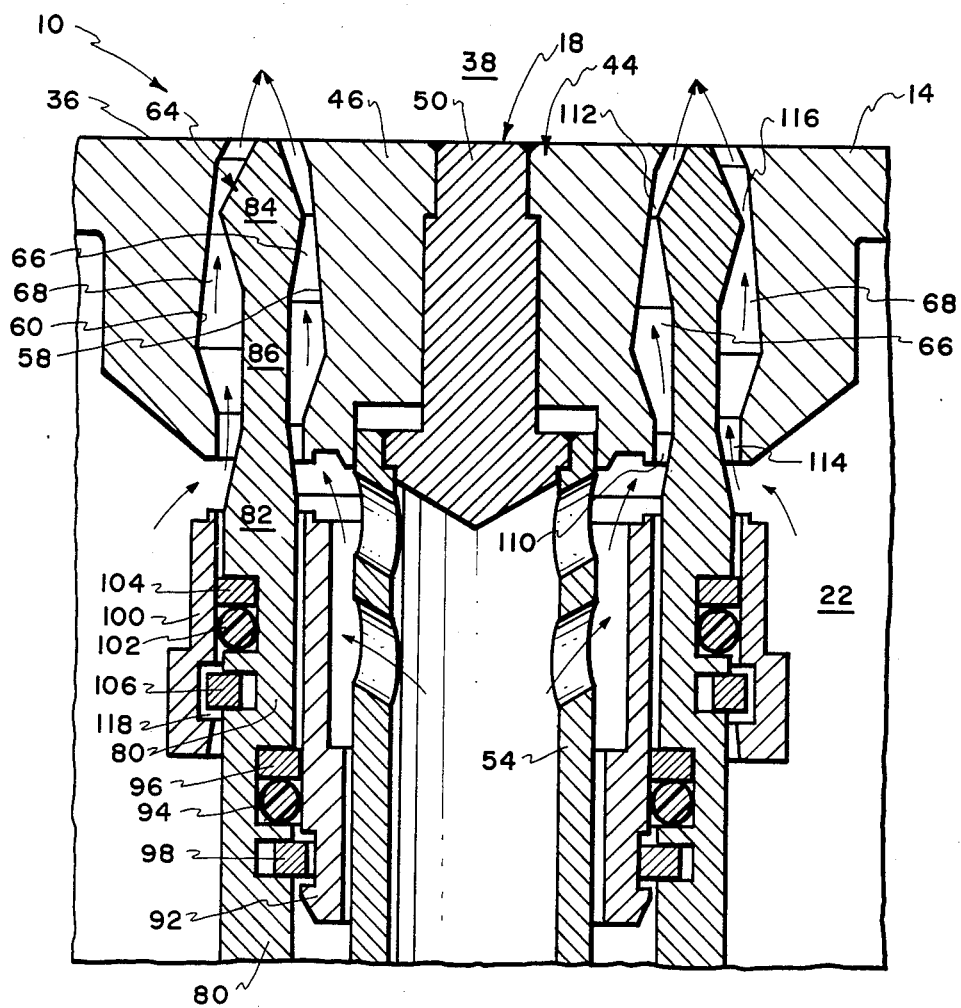
FIG. 4 is another enlarged view with the pintle element moved away from the combustion chamber, thereby opening the injector for propellant flow.

During operation, the actuator 16 and the pintle element 64 are moved away from the combustion chamber 38 to the open position shown in FIG. 4. Gaps or orifices 110, 112, 114 and 116 are thereby formed. In this position the first propellant, i.e. most likely fuel, passes through inlet 20 (not shown in FIG. 4) and through fuel passage member 54. It then passes through gap 110 into inner passageway 66 through gap 112 and finally into the combustion chamber 38.

The second propellant, i.e. most likely oxidizer, passes through inlet 22 through gap 114 into outer passageway 68 through gap 116 and finally into the combustion chamber 38.

In a throttle-down, the pintle element 64 first seats at the downstream sealing locations 70 and 72. Then the two seating rings 92 and 100 move a few mils toward the combustion chamber 38 (driven by pressure) until they seat at locations 74 and 76. Gap 118 as shown in FIG. 3 allows seating ring 100 to move a few mils toward the combustion chamber 38 to seal against plug 44 when the pintle element 64 is in the closed position. The same is true on the fuel side. The two seating rings 92 and 100 are independent from each other in order to able to independently seal against their respective seats.

Use of mechanically coupled upstream orifices and downstream orifices for the two propellants derives significant benefits. Mechanical coupling permits use of a single actuator and improves reliability. The upstream orifices control the injector inlet pressure, without cavitation, during throttling in order to maintain a constant stream momentum and to maintain the combustion efficiency during throttling. The object is to produce a certain predetermined stream velocity ratio through the downstream seals into the combustion chamber 38 against the prevailing combustion chamber pressure. Since the combustion chamber pressure is variable, the pressures in inner and outer passageways 66,68 become variables.

Low stream velocity results in poor oxidizing and poor combustion efficiency. Excessive stream velocity can cause stream separation resulting again in reduced combustion efficiency. Thus, stream velocity control is important. Typically, a design goal is to provide an injector pressure drop approximately equal to 20% of chamber pressure. This invention is able to produce an injector pressure drop that is a predetermined percentage of the chamber pressure by utilizing upstream and downstream orifices for each propellant. The mechanism is as follows: The chamber pressure is variable. Therefore, in order to maintain, for example, a 20% (20% of chamber pressure) drop across the injector, variable pressures must be provided at locations 66 and 68. Since the supply pressures is constant, it must be transformed into variable pressure as required at locations 66 and 68. This pressure conditioning is accomplished by upstream orifices 110 and 114, in a non-cavitating regime.

Figure 5:
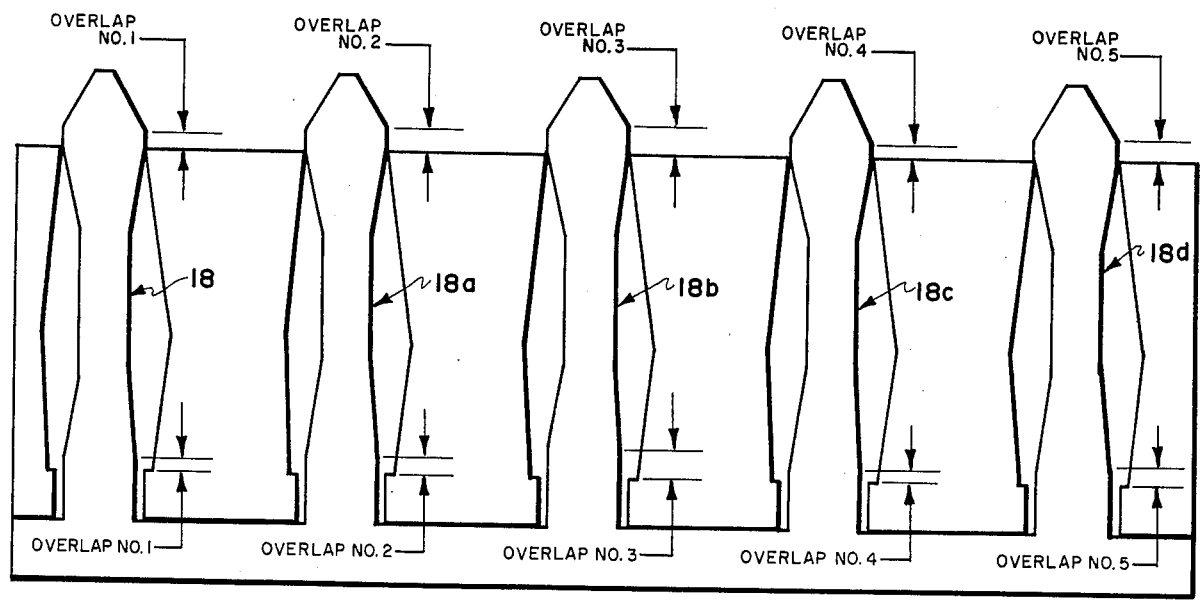
FIG. 5 is a schematic illustration showing how the various injector subassemblies have overlaps thereby resulting in sequenced injector flow.

As noted, the preferred embodiment consists of a plurality of injector heads or subassemblies designated 18–18d. Each subassembly is activated by the common actuator 16. FIG. 5 is a schematic illustration of these multiple injector heads. As shown in this figure, a sequential opening of the injector flow (sealing) areas is provided in a controlled manner by predetermined sizing of the overlaps.

The purpose of the overlaps is to be able to provide a very small controlled flow through a single element at least initially and to gradually increase the flow through the apparatus 10 as a whole by sequentially opening the orifices. In the deep throttling operating range a small number of injector heads can be activated, and the other injector heads provide a small amount of flow necessary for the injector thermal management. In a typical application only one injector head will be modulating propellant flow in the first 5% of actuator movement. At 30% actuator displacement, all the other injector heads will modulate propellant flow.

The injector volume is utilized more effectively by using multiple injector elements, thereby resulting in small moving masses. Using smaller moving masses allows for a smaller control actuator 16. This also provides for the potential to increase the response capability of the engine. High response capability is critical for control application of the engine of the present invention.

The multiple head throttling injector of the present invention provides the benefit of a reduced spray thickness at full open position. This is due to the flow division between the injector heads. The reduced spray thickness allows the application of this throttling concept to be extended to higher maximum thrust levels.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An injector assembly for injecting first and second propellants into a combustion chamber of a fluid fueled rocket engine, comprising:

a stationary housing;

a plate member rigidly attached to said housing, said plate member having an upstream face and a downstream face, the downstream face being adjacent a combustion chamber, said plate member having at least one opening therethrough;

an injector subassembly contained within said opening, including:

a plug centrally disposed therein, said plug being rigidly attached to said housing, an outer surface of said plug and an inner surface of said plate member forming said opening cooperatively defining a flow passageway; and an elongated injector throttle means comprising a single element surrounding said plug and located within said flow passageway for dividing said flow passageway into an inner passageway for a flow of said first propellant and an outer passageway for a flow of said second propellant, said throttle means being movable within said flow passageway for simultaneous flow control of each propellant at inner and outer downstream sealing locations adjacent the downstream face of said plate member and at inner and outer upstream sealing locations adjacent the upstream face of said plate member, this simultaneous flow control being dependent upon the position of the throttle means within the plate member, said throttle means including:

an upstream end portion;

an upstream sealing portion, located adjacent said upstream end portion and at said upstream sealing locations, said upstream sealing portion having a cross-sectional area substantially equal to the area of said flow passageway;

a downstream sealing portion located at said downstream sealing locations with a cross-sectional area substantially equal to the area of said flow passageway; and a decreased cross-sectional area portion located between said upstream sealing portion and said downstream sealing portion; and actuation means for controlling the movement of said throttle means, said actuation means being operably engaged with said upstream end portion, said upstream sealing portion serving to control the flow of propellants at said upstream locations for controlling the propellant pressure at the downstream sealing locations during thrust level changes and corresponding combustion chamber pressure changes of the engine, thereby maintaining a constant stream momentum and combustion efficiency.

2. The injector assembly of claim 1 wherein said opening is substantially circular and said plug is substantially cylindrical so that said passageway defined by the outer surface of said plug and the inner surface of said plate member forming said opening is annular.

3. The injector assembly of claim 2 wherein said throttle means is substantially cylindrical.

4. The injector assembly of claim 3 wherein said plug has a decreased diameter in a region opposed to the decreased cross-sectional area portion of said throttle means.

5. The injector assembly of claim 1 wherein said plate member has a plurality of openings therethrough, each opening containing an injector subassembly.

6. The injector assembly of claim 5 wherein said actuation means includes:
   a single linear actuator; and
   means for operably engaging the throttling means of each injector subassembly simultaneously.

7. The injector assembly of claim 6 wherein said plurality of injector subassemblies are equidistantly disposed in a circumference about said linear actuator, said circumference being coaxial with said linear actuator.

8. The injector assembly of claim 6 wherein the geometry of said upstream end portion, upstream sealing portion, downstream sealing portion, and decreased cross-sectional area portion of each of said throttling means are so arranged to cooperate with said plug and with said plate member so as to provide a predetermined, controlling, sequential injection of propellants into the combustion chamber.

9. An injector assembly for injecting first and second propellants into a combustion chamber of a fluid fueled rocket engine, comprising:
   a stationary housing;
   a plate member rigidly attached to said housing, said plate member having an upstream face and a downstream face, the downstream face being adjacent a combustion chamber, said plate member having a plurality of openings therethrough;
   a plurality of injector subassemblies, each contained within one of said openings, each subassembly including:
      a plug centrally disposed therein, said plug being rigidly attached to said housing, an outer surface of said plug and an inner surface of said plate member forming said opening cooperatively defining a flow passageway; and
      an elongated injector throttle means comprising a single element surrounding said plug and located within said flow passageway for dividing said flow passageway into an inner passageway for a flow of said first propellant and an outer passageway for a flow of said second propellant, said throttle means being movable within said flow passageway for simultaneous flow control of each propellant at inner and outer downstream sealing locations adjacent the downstream face of said plate member and at inner and outer upstream sealing locations adjacent the upstream face of said plate member, this simultaneous flow control being dependent upon the position of the throttle means within the plate member; and
   linear actuation means for controlling the movement of said throttle means, said injector subassemblies being equidistantly disposed in a circumference about said linear actuation means, said circumference being coaxial with said linear actuator means.

* * * * *